July 29, 1947.　　J. F. STOECK ET AL　　2,424,719
AUTO REEL LIGHT
Filed Jan. 13, 1944　　2 Sheets-Sheet 1
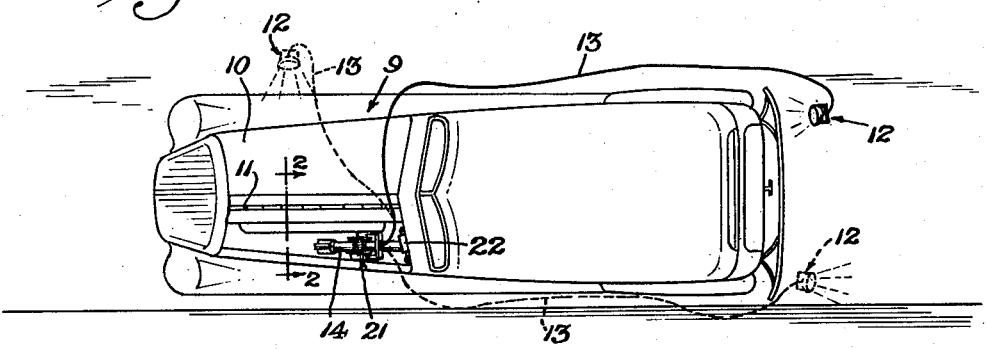
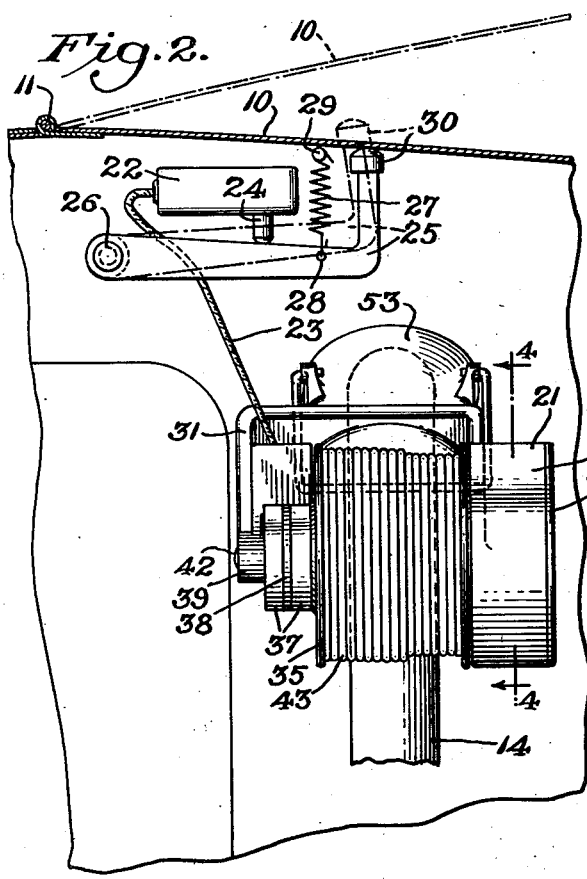
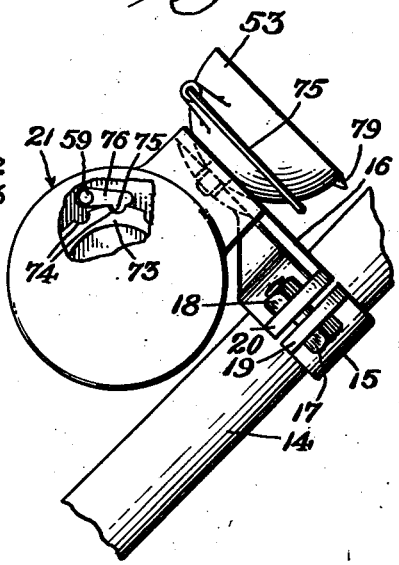
Inventors
Joseph F. Stoeck
Anthony J. Valrose
BY
David Mowly Heller
Attorney

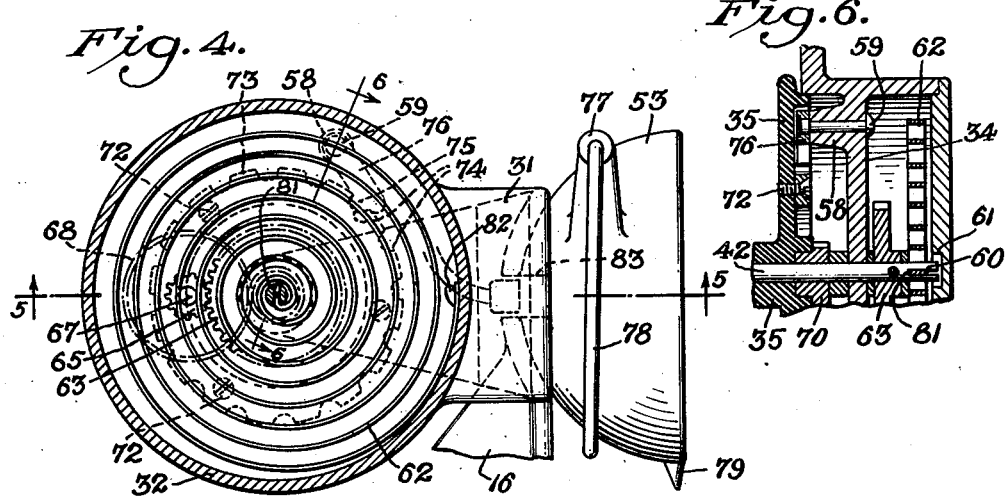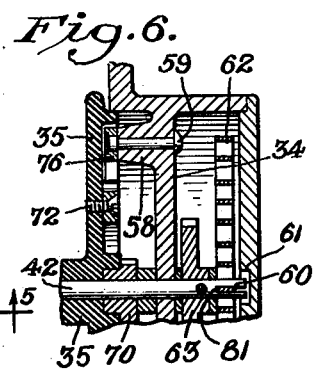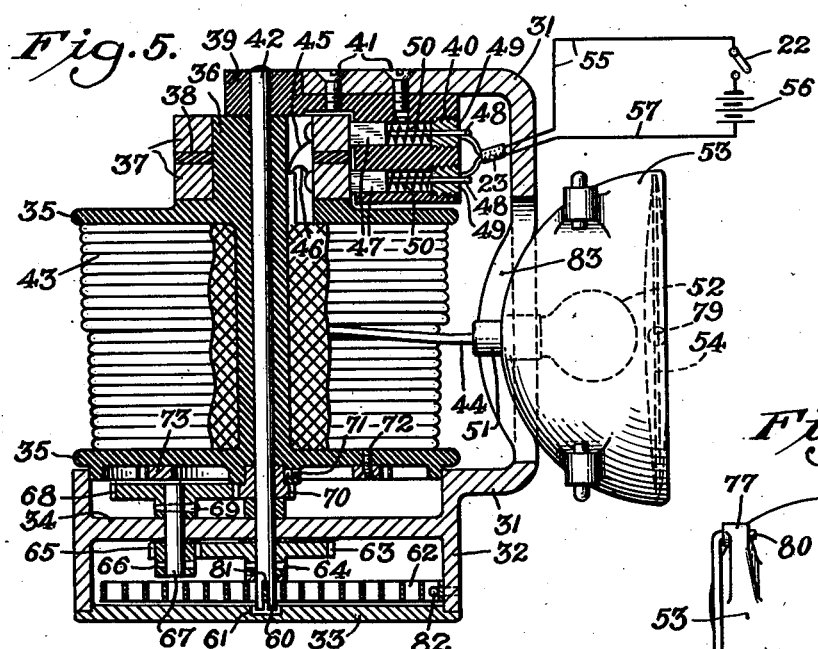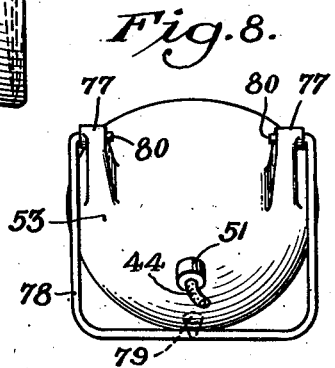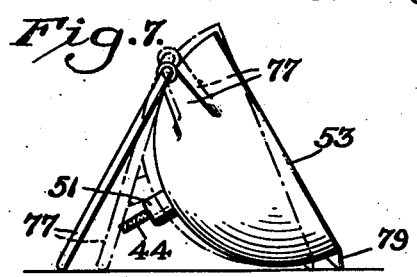

Patented July 29, 1947

2,424,719

UNITED STATES PATENT OFFICE 2,424,719

AUTO-REEL LIGHT

Joseph F. Stoeck and Anthony J. Valrose,
Chicago, Ill.

Application January 13, 1944, Serial No. 518,040

1 Claim. (Cl. 240—8.18)

Our invention relates to improvements in devices characterized as reel lights to be used in connection with machinery, or equipment, more or less, in the sense to serve the purpose of a trouble lamp which can be conveniently hung or positioned with respect to a piece of machinery or equipment so that intense illumination will be concentrated upon the portion of the machinery, or equipment, which is to be operated upon; and more particularly, to be used in connection with an automobile, or like vehicle, the said invention being so attached to and cooperating with the hood of an automobile as to prevent the electrical circuit remaining closed when the trouble lamp is not in actual use thus making the device fool-proof and preventing the dissipation of electrical energy from the source of supply when the device is not in use.

An important object of our invention is to provide a reel type of lamp which can be, instantaneously and conveniently, mounted on the steering post of an automobile, preferably, that portion of the steering post concealed below the hood, and switch means in combination therewith cooperatively associated with the articulate hood structure of an automobile making it necessary to close the hood and completely lock the same, an operation that must be resorted to before a driver may continue to operate the said automobile, or vehicle.

Another object of our invention is to provide, in a device of the aforementioned character, a pawl and ratchet structure which will maintain the reel and spool structure of the reel in any position after a length of wire has been "paid out" of the reeling device, and a pawl structure which can be easily disengaged to allow spring means to automatically rewind the cable or wire which has been fed out, or "paid out" of the reel structure prior thereto.

Another object of our invention is to provide, in combination with a reel light assembly, a lamp structure or casing which is adapted to be hung, or conveniently positioned, in various angular positions so as to permit adjusting the illuminating means to concentrate effectively the rays of light emanating therefrom on any particular spot that it may be desired to work upon.

Another object of our invention is to provide a reel case structure which has concave seating means in order to accommodate the convex structure of a head light casing.

Another object of our invention is to provide a device of the aforementioned character, which is practical in its construction, useful and efficient in its operation, and of such simple elemental construction as to permit manufacture thereof economically in quantities.

Other objects, features and advantages inherent in our invention will become apparent from an examination of the accompanying drawings with reference to the ensuing description, wherein like numerals will designate like parts; and in which;

Fig. 1 represents in elevation a view, generally, designating the top of an automobile and showing our invention connected or attached to the steering post thereof, also indicating the range of manipulation and positions to be made accessible with the particular structure embodied in our invention.

Fig. 2 is an enlarged fragmentary side view of our invention connected to the steering post of an automobile, showing the articulate hood section thereof, and its cooperation with the switch means employed for fool-proofing the operation of our invention.

Fig. 3 is a front view of the view shown in Figure 1, or an end view of Figure 2, so much of the said view being shown as to indicate the detail structure of the clamping means of our device, and its attachment to an automobile steering post, also showing the pawl structure embodied in the reeling means.

Fig. 4 is a cross-sectional view taken on the line 4—4 of Figure 2.

Fig. 5 is a cross-sectional view taken substantially on the line 5—5 of Figure 4, showing the reflector structure in elevation.

Fig. 6 is a fragmentary cross-sectional view taken on the line 6—6 of Figure 4.

Fig. 7 is a view showing the structural details of the light or lamp structure unit, with its appurtenant attachments for positioning the same in various angular relationships.

Fig. 8 is a rear view of the view shown in Figure 7 in order to bring out the lamp support elements in greater detail.

Referring to Figure 1, our invention is, generally, characterized by the numeral 21 indicating the reel structure, the automobile is, generally, designated 9, the hood thereof 10 the hood being, preferably, built in two sections and hinged together by the articulate structure 11. The lamp unit is, generally, designated 12 and is connected to the reel structure by means of an indeterminate length of wire or cable 13. The said view indicates in dotted lines, also in full lines, various ranges of position to be attainable by the use of our invention; showing how the light or lamp structure 12 may be conveniently positioned to encompass the entire magnitude of range of positions required so as to make the light accessible for lighting any part of the automobile, including as well the inner portion of the body, when it is deemed necessary, or when it is desired to use it for illumination of the interior, or for use in connection with illuminating the bottom or chassis structure of the automobile, when the same is either resting on the ground, or on jacks suitable for raising the same for more convenient examination for repairs and for such other purposes as may be needed.

In Figure 2, the switching means employed in combination with the reel structure 21 is shown in detail and the same may be mounted on the rear of the dash board structure of the automobile, and concealed below the hood in such a position as to make it necessary to close the hood completely in order to open the circuit. The said structure consists of the switch as heretofore mentioned 22 which is provided with a movable contact 24 which is spring actuated and is connected thru a wire 23 to the reel structure.

A lever designated 25 pivoted at 26 is associated with the contact point 24, the said lever having a dome-shaped button 30 which is adapted to be pushed down by the hood section 10; the spring 27 which is anchored at 29 and secured to the lever 25 at the point 28, normally, tending to maintain the lever 25 in the upward position indicated by the dotted lines, thus closing the switch 24 (the contacts within it not shown in the drawing).

In Figure 3, the clamping means of the reel structure is shown in detail where 14 designates the steering post of the automobile, the reel structure being provided with a clamp portion 16 semi-circular in shape to accommodate the steering post 14 and a separable section 15 also semi-circular in shape, the said two sections being provided with flanges 20 and 19, respectively, and secured by bolts 17 and nuts 18.

The reel structure is comprised of a body section 31 having a sleeve or cylindrical extension 32 which has a central web portion 34 to furnish anchorage means for the train of compound gears positioned therein. The said cylindrical extension 32 being closed at one end by a cap 33 secured thereto, the open end of the said cylindrical structure acting as a bearing for the spool structure 35. The spool 35 in turn is mounted on the shaft 42 so as to rotate freely thereupon. The shaft 42 is rigidly mounted in the bracket 39, its other end being mounted within the bearing portion 61, the end of the shaft 42 designated 60 being slotted in order to accommodate one end 81 of the spiral spring 62, the other end of the spring being secured at 82, somewhere on the outer surface of the cylindrical extension 32. The spool is secured to a pinion 70 by virtue of a set screw 71 or other suitable means. The pinion meshes with a gear 68 which is fastened by pin 69 to an auxiliary shaft 67 which is rotatably mounted in the web 34, the other end of the shaft 67, the one below the web 34 being secured by a pin 66 to a pinion 65, which in turn meshes with the gear 63 secured by a pin 64 to the shaft 42, so that when the spool rotates it produces differential rotation in the shaft 42, in other words, the spool will rotate at a greater speed than the shaft 42, which while rotating will store kinetic energy in the spring 62, so that when the spring 62 is released and free to operate, it will tend to reverse the rotation of the spool 35. On the spool 35 a suitable length of wire 43 is mounted in the form of regular turns thereon, and the innermost end of the wire is comprised of two terminals 45 and 46 which are permanently secured to the commutator segments 37 being separated by insulating material 38. The commutator segments 37 are mounted on the spool hub 36, the entire spool being also of insulating material, such as hard rubber, so as to permit operation of the commutator segments without short circuiting the entire combination.

Upon the commutator segments which rotate with the spool 35, we indicate brushes 47 which are in frictional contact therewith, being urged into frictional contact by the springs 50, the said brushes having metallic extensions 48 which are permanently secured to the lead wire 23. The assemblage of the brushes and springs being effectuated by virtue of screw plugs 49.

It is to be noted that the bracket 39 is made of insulating material so as to prevent the brushes and the brush structure from becoming short circuited. The lead wire 23 is shown connected to the source of supply in the circuit indicated in Figure 5, by virtue of having one of the leads 55 connected to the switch in series with the switch 22 and in series with the storage battery 56, and by virtue of the return lead 57 going back to the lead wire 23 thus completing the circuit.

The free end 44 of the wire 43 is connected to a socket 51 which is part of the casing and reflector 53, which in turn is adapted to receive a lamp 52, the open portion of casing 53 is adapted to receive the lens 54 which may be held in place by any suitable and known means, such as a split wire ring.

The reflector casing is provided with two extensions 77 which are suitably drilled in order to receive the U shaped support structure 78 having extensions 80 articulately connected to the drilled openings of the extensions 77; whereas the forward portion of the reflector, at the bottom, is provided with a conical foot-like element 79 so that the rear support 78 cooperating with the foot 79 makes it possible to rest the headlight on any suitable ground or support, and the angular adjustment of the element 78 permits an angular adjustment in the beams or rays of light which are thrown from the headlight 53. The element 78 also permits the headlight to be hung on any hook that may be conveniently located to the point of operation.

In order to permit paying out the cable 13, as well as permit reeling it up when desired, we provide a ratchet structure 73 which is secured to the reel by virtue of screws 72 and is provided with semi-circular concave indentations 74, so as to mate with the semi-circular tooth 75 of the pawl 76. The pawl 76 is mounted on a hub 58, which is integral with the web 34, and the pivot element 59 permits free rotation of the pawl 76 actuated by gravity, hence tending to keep it in engaged relationship with respect to the ratchet 73. The bracket member 39 which is made of insulated material is provided with an extension 40, as heretofore mentioned, and is secured in place by attaching it to the body 31 by virtue of screws 41.

The body 31, as can be seen in Figure 5, is provided with a concave pocket-like section which is slotted in order to permit the wire to work from end to end of the spool during winding and unwinding, and at the same time furnishes a universal seat for the curvature of the headlight 53.

The device is mounted as shown in Figures 1, 2, and 3 and when it is desired to use the light for any purpose, the hood of the automobile has to be opened, which, incidentally, throws lever 25 into the dotted position so as to close the microswitch 22 thus closing the circuit. The headlight 53 is grasped in the hand and a sufficient quantity of wire is pulled out rather rapidly. When the ratchet 73 rotates rapidly, it prevents engagement of the pawl 76 therewith; however, when the proper amount of cable has been "paid out," and it is desired to maintain the spool 35 in a static and locked position, by pulling the same back and forth a short distance, the tooth 75 will find its nearest recess 74 and engage therewith, thus holding the spool stationary, thence the lamp may be positioned wherever it is desired by arranging it to the best angular position, or to the best height by hanging as heretofore elucidated.

When the work is completed and it is desired to replace the lamp in its socket, the cable 13 is actuated a short distance back and forth so as to disengage the pawl, and then allowed to reel back rather rapidly so as to wind up the wire until the headlight 53 is brought into seating relationship with the concave portion 83. At this point it will be noticed that the light is still on, and not until the section of the hood 10 is completely closed and locked by virtue of locking means furnished on the automobile, that the light will go out. Because one cannot very well drive an automobile with the hood up, and since the hood if not completely brought down and locked, rattling will call attention to the fact that it must be firmly closed. Furthermore, the lights act as a visual signal until the hood is closed thus making it impossible to omit or neglect to open the circuit of the lighting means which would ultimately result in draining the battery of vital energy needed for operating the automobile.

Altho, we have, herein described and revealed rather succinctly the nature and operation of our invention, and inasmuch as it is susceptible of many modifications, alterations and improvements, we hereby reserve the right to all such improvements coming within the scope and spirit of our invention, as well as those suggested by the embodiments in the drawings, and also those falling within the purview of the foregoing description; our invention to be limited only by the subjoined claim.

Having thus described and revealed our invention, what we claim as novel and desire to secure by Letters Patent is:

In a reel light, a housing having a body and provided with a spherically concave seat portion on an outer wall thereof, a reel rotatably mounted in said housing, the axis of the said reel and the mid-section of the said seat portion lying within the same geometric plane, a spindle mounted in the said housing, spring-urged winding means mounted in the said body and connected to the said spindle, a length of wire coiled about the drum portion of the said reel, a narrow slot formed in the said seat portion extending diametrically across the said seat portion beyond the magnitude of the said reel and lying in the same geometric plane with the axis of the said reel, the said wire having its free end trained through the said narrow slot, and a lamp encased in a convex shell and connected to the free end of the said wire, the said convex shell adapted to be retained in the said spherically concave seat portion by the said spring-urged winding means when in inoperative position, the said narrow slot permitting level winding of the said wire on the said reel.

JOSEPH F. STOECK.
ANTHONY J. VALROSE.

REFERENCES CITED

The following references are of record in the file of this patent:

UNITED STATES PATENTS

| Number | Name | Date |
|---|---|---|
| 2,164,149 | Underdorfel | June 27, 1939 |
| 2,168,118 | Dickson | Aug. 1, 1939 |
| 2,070,548 | Hickey | Feb. 9, 1937 |
| 1,319,473 | Grigsby | Oct. 21, 1919 |
| 1,951,330 | Gibson | Mar. 13, 1934 |
| 1,411,206 | Dorion | Mar. 28, 1922 |
| 1,288,511 | Clarke | Dec. 24, 1918 |
| 2,034,100 | Hoefflinger | Mar. 17, 1936 |
| 854,554 | Barrett | May 21, 1907 |
| 972,077 | Graves | Oct. 4, 1910 |
| 1,027,634 | Williamson | May 28, 1912 |
| 1,175,498 | Anderson | Mar. 14, 1916 |
| 1,256,016 | Henderson | Feb. 12, 1918 |
| 448,164 | Reinmann | Mar. 10, 1891 |
| 1,374,455 | Lamb | Apr. 12, 1921 |
| 2,391,840 | Meletti | Dec. 25, 1945 |
| Re. 15,437 | Anderson | Aug. 29, 1922 |

FOREIGN PATENTS

| Number | Country | Date |
|---|---|---|
| 385,740 | Great Britain | 1933 |
| 456,815 | Germany | 1928 |
| 633,086 | Germany | July 18, 1936 |